United States Patent
Wagener

(10) Patent No.: US 8,675,211 B2
(45) Date of Patent: Mar. 18, 2014

(54) FORK LIGHT BARRIER, AND DEVICE AND METHOD FOR DETERMINING POSITION BY MEANS OF A FORK LIGHT BARRIER

(71) Applicant: Sartorius Weighing Technology GMBH, Goettingen (DE)

(72) Inventor: Markus Wagener, Goettingen (DE)

(73) Assignee: Sartorius Weighing Technology GmbH, Goettingen (DE)

( * ) Notice: Subject to any disclaimer, the term of this patent is extended or adjusted under 35 U.S.C. 154(b) by 0 days.

(21) Appl. No.: 13/662,889

(22) Filed: Oct. 29, 2012

(65) Prior Publication Data

US 2013/0050714 A1   Feb. 28, 2013

Related U.S. Application Data

(63) Continuation of application No. PCT/EP2011/000687, filed on Feb. 15, 2011.

(30) Foreign Application Priority Data

Apr. 29, 2010 (DE) .......................... 10 2010 016 684

(51) Int. Cl.
*B66B 3/02* (2006.01)
*G01B 11/14* (2006.01)

(52) U.S. Cl.
USPC ............................. 356/621; 356/614; 187/393

(58) Field of Classification Search
USPC .................... 356/621–622, 638, 237.6, 239.1; 187/393
See application file for complete search history.

(56) References Cited

U.S. PATENT DOCUMENTS

| | | | | |
|---|---|---|---|---|
| 4,434,874 A | * | 3/1984 | Caputo | 187/293 |
| 5,135,081 A | * | 8/1992 | Watt et al. | 187/394 |
| 5,648,645 A | | 7/1997 | Arpagaus et al. | |
| 5,889,239 A | * | 3/1999 | Blackaby et al. | 187/391 |
| 6,206,143 B1 | * | 3/2001 | Kammura | 187/400 |
| 6,586,719 B1 | | 7/2003 | Bartzke et al. | |
| 7,057,162 B2 | | 6/2006 | Rentzsch | |
| 7,531,787 B2 | | 5/2009 | Reime | |
| 8,121,805 B2 | * | 2/2012 | Duan et al. | 702/95 |
| 2004/0135072 A1 | | 7/2004 | Huff | |

FOREIGN PATENT DOCUMENTS

| | | |
|---|---|---|
| DE | 10245170 A1 | 4/2004 |
| EP | 0377097 A1 | 7/1990 |
| EP | 0617298 A2 | 9/1994 |
| EP | 2101197 A1 | 9/2009 |
| GB | 2278916 A | 12/1994 |
| WO | 2005088349 A1 | 9/2005 |

* cited by examiner

*Primary Examiner* — Gregory J Toatley
*Assistant Examiner* — Rebecca C Bryant
(74) *Attorney, Agent, or Firm* — Sughrue Mion, PLLC

(57) ABSTRACT

A fork light barrier (1), provided with at least one first, one second, and one third light sensor (FT1 to FT3), which are arranged along an axis (X), wherein the second light sensor (FT2) lies between the first light sensor (FT1) and the third light sensor (FT3). The fork light barrier is advantageously incorporated into a position determining device and/or method.

8 Claims, 3 Drawing Sheets

FORK LIGHT BARRIER, AND DEVICE AND METHOD FOR DETERMINING POSITION BY MEANS OF A FORK LIGHT BARRIER

This is a Continuation of International Application PCT/EP2011/000687, with an international filing date of Feb. 15, 2011, which was published under PCT Article 21(2) in German, and the complete disclosure of which, including amendments, is incorporated into this application by reference.

FIELD OF AND BACKGROUND OF THE INVENTION

The invention relates to a fork light barrier, and in particular to a position determining device and/or method employing such a fork light barrier.

In order to detect the position of parts moving relative to one another, in conventional devices, fork light barriers are used with a light-emitting diode and two light sensors. Attached to one part at regular separations are so-called vanes and windows which move, according to the relative movement of the parts, between the light-emitting diode and the light sensors. If a so-called vane is positioned in front of a light sensor, the light stream from the light-emitting diode to the light sensor is interrupted. If a window is positioned between the light-emitting diode and the light sensor, the light stream is free to strike the light sensor. The arrangement of the light barrier or the size of the vanes and windows is selected such that, according to the electrical light barrier signals, both the distance covered and the movement direction can be determined. A disadvantage of the known devices for determining position as described above is that said devices can only detect position incrementally. In order to recognize a reference position, such as a start position or a zero location, a further sensor is required. This sensor is typically provided by means of a further fork light barrier which is interrupted in the whole region of travel of the moving body at one position by a single vane. The use of a second fork light barrier or of a second sensor and a further light sensor and a second, separate vane represents an undesirable additional outlay for the arrangement.

DE 102 45 170 A1 discloses a device and a method for positioning an optical component. Two detectors are provided herein which simultaneously detect different encoding means if the recording device is situated in a particular detent position. In a region between two adjacent detent devices, only one of the two detectors detects an encoding means. In this construction, it is not possible to easily determine the rotation direction from the light signals.

U.S. Pat. No. 6,586,719 B1 discloses a light barrier for determining the movement of two objects relative to one another. The TR pairs (transmitter-receiver pairs) are arranged alternately on opposing sides of the two moving parts. The moving parts have particular geometrical transmission or reflection properties. However, the structure of said geometrical surfaces and the evaluation thereof are too complex.

U.S. Pat. No. 5,648,645 A discloses an elevator speed detector wherein vanes and windows are arranged on a measuring strip in the elevator shaft. The measuring strip has two regions on which a plurality of vanes and windows having increasing size and spacing are arranged, in alternating manner. Furthermore, test marks are provided to preclude errors. The arrangement disclosed herein therefore also requires a plurality of optical interrupter paths (vanes and windows). Movement direction recognition is also not provided.

EP 2101197 A1 and EP 0 617298 B1 disclose simple fork light barriers which have only one transmission path.

EP 0 377097 B1 discloses an absolute position sensor for determining the position of a steering wheel, having a plurality of sensors which are arranged individually around an encoding disk.

The aforementioned known arrangements and methods employ various different approaches but do not enable any simple determination of the reference position, the incremental movement as well as the movement direction.

OBJECTS AND SUMMARY OF THE INVENTION

It is an object of the invention to provide a device and a method which, in simple manner, enable a reference position and an incremental movement as well as the movement direction of a movable part to be determined.

According to a first aspect of the invention, a fork light barrier is provided which has at least three light sensors. Said three light sensors are arranged along an axis. A first light sensor, a second light sensor and a third light sensor are provided, the second light sensor being arranged between the first and third light sensors. In this way, a reference or zero location can also essentially be detected with the fork light barrier by means of incremental position detection.

The separation of the first light sensor from the second light sensor of the three light sensors can advantageously be less than the separation of the second light sensor from the third light sensor of the three light sensors. By this means, the reference position or the zero location can be detected more reliably.

Advantageously, the three light sensors and the at least one light-emitting element are arranged in a common housing. This renders it possible, through modification of the length of windows and vanes, to detect each of the movement direction, the position and also the reference position (zero location or start position).

The fork light barrier can comprise one or more light-emitting components, for example, one or more light-emitting diodes. Said light-emitting diode/diodes is/are configured so as to emit light in the direction toward the light sensors. The light beam(s) of the light-emitting component(s) is/are either interrupted or allowed through by the passing windows and vanes.

A fork light barrier according to the invention can also be equipped with three light-emitting components (for example, LEDs) and only one photodiode. Advantageously, the light-emitting components light up and extinguish alternately at a pre-determined frequency. Based on knowledge of the control of the light-emitting components and the respective state of the photodiode, the respective position of the windows or vanes can then also be determined.

The fork light barrier can advantageously be used in devices for detecting the position or location of two parts which are moving relative to one another. The axis on which the three light sensors are arranged advantageously lies along a movement direction of vanes and windows. The vanes and windows, in turn, move in accordance with the relative motion of the parts themselves, allowing the position, location and/or movement direction of said parts to be detected.

In an advantageous embodiment, the length of at least one vane or of a window is changed such that, in this way, the start position, zero location or reference position can be detected automatically. This is achieved, for example, if a first vane or a first window is shorter than the separation of the first and third light sensors and a second vane or a second window is long enough in order to cover the first, second and third light sensors simultaneously. Therefore at least one window or vane is provided which has an excess length relative to the other windows and vanes. It thereby becomes possible, in general, to detect both an incremental movement of the moving part and the reference position. As soon as the first, second and third light sensors are covered simultaneously or uncovered simultaneously, the device is able to confirm that the reference position has been reached. As long as this does not take place, the light sensors are covered or uncovered in a particular sequence from the first to the third or from the third to the first light sensor. In this way, the direction of the movement, the relative position as well as the absolute position or location of the parts moving relative to one another can all be determined on the basis of the light falling on the light sensors. In the context of the present application, a window lessens the incidence of light from a light-emitting element arranged at the fork light barrier onto the light sensors less strongly than does a vane. In the simplest case, the vane interrupts the light beam from the light-emitting element to one or more light sensors, while a window enables the unhindered incidence of light.

In an advantageous embodiment, the length of the second vane can be one and a half times the length of the first vane. In this way, the length of the vane and the length of the window can be, for example, L1. The length L2 of the second vane (reference vane) can then be 1.5*L1. The separation of the first sensor from the second sensor can advantageously be 0.5*L1. The separation of the second sensor from the third sensor can then be 0.75*L1.

According to another embodiment, windows and vanes can be swapped. This would mean that not all three sensors would be covered simultaneously in order for the reference position to be recognized, but rather that all three sensors would be illuminated simultaneously.

The length of the second window could therefore be one and a half times the length of the first window. In this case, also, the length of the vane and the length of the window could be, for example, L1. The length L2 of the second window (reference window) can then be 1.5*L1. The separation of the first sensor from the second sensor can then advantageously be 0.5*L1 and the separation of the second sensor from the third sensor can be 0.75*L1.

In an advantageous embodiment, due to the signal symmetry, the first light sensor and the second light sensor can then be used for incremental position determination.

According to the present invention, three light sensors can be provided in a common housing in the form of a single fork light barrier. Overall, this results in a reduced cost for component placement and assembly. The separations between the sensors can be predetermined on the basis of the arrangement thereof in the housing. Adjustment of the individual light sensors relative to one another is then no longer necessary.

In another embodiment, the light sensors can also be provided in a plurality of individual housings if the spatial arrangement therefor requires.

According to a further aspect of the present invention, a method is provided for detecting the position of a moving part. The position is advantageously detected with a fork light barrier which has at least three light sensors arranged along the movement direction of the moving part. A second light sensor can lie between a first and a third light sensor.

The separation between a first light sensor and a second light sensor can advantageously be smaller than the separation of the second light sensor from a third light sensor. The detection of a reference position, starting position or zero location is advantageously carried out in that the incidence of light onto the first, second and third sensor is interrupted. Alternatively, the reference position can also be determined in that the incidence of light onto the first, second and third sensor simultaneously is possible or can take place on all three sensors simultaneously.

BRIEF DESCRIPTION OF THE DRAWINGS

Further aspects of the present invention are disclosed in the following description of exemplary embodiments, making reference to the accompanying figures, in which.

DETAILED DESCRIPTION OF EXEMPLARY EMBODIMENTS

Figure 1:
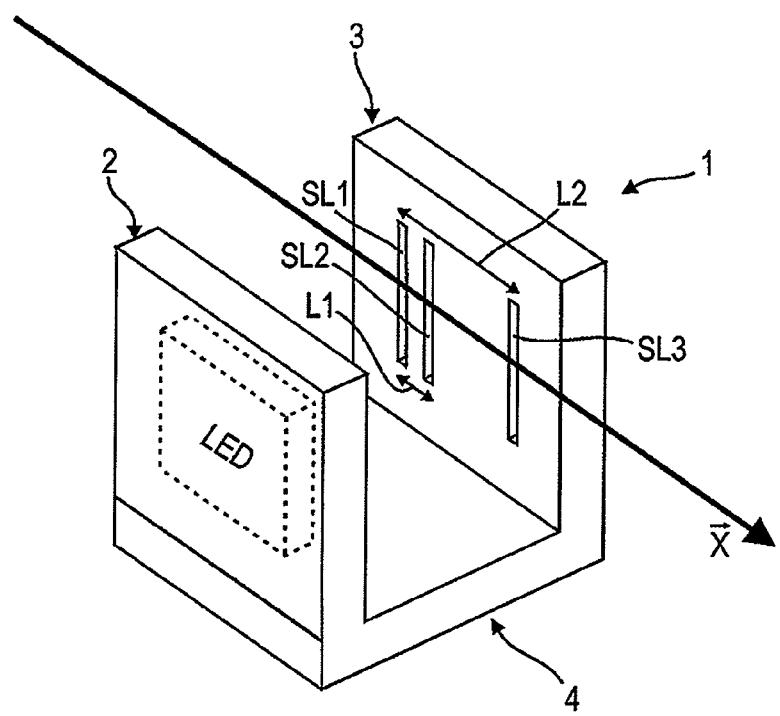
FIG. 1 is a representation of a fork light barrier according to an exemplary embodiment of the present invention.

FIG. 1 shows a fork light barrier 1 according to aspects of the present invention. The fork light barrier is constructed from a fixed housing and has two parallel limbs 2 and 3 lying opposing one another and held at a fixed separation and in a fixed arrangement relative to one another by a web 4. Arranged in the limb 2 are one or more light-emitting elements such as one or more light-emitting diodes (LED) which, during operation, emits/emit light towards the opposing limb 3. Provided in the opposing limb 3 are three slits SL1, SL2 and SL3. According to the invention, said slits are provided such that the first slit SL1 and the second slit SL2 are arranged closer to one another than are the second slit SL2 and the third slit SL3. Arranged behind each of the slits SL1, SL2 and SL3 is a light sensor (for example, photodiode or photosensor) which detects whether light falls through the slit or not. The slits SL1, SL2 and SL3 are also arranged along an axis X which also corresponds to the movement direction of vanes and windows which are arranged at a part which moves relative to another part. The movement along the movement direction $\vec{X}$ is linear or a partial approximation to a linear movement, e.g. a section of a rotary or circular movement, so that the vanes and windows move along between the limbs 2 and 3 of the fork light barrier. The movement takes place in accordance with a movement of parts moving relative to one another, the relative position or location of which parts is to be determined.

The separation of the two slits SL1 and SL2, specifically the separation from outer edge to outer edge, is L1. The separation of the slits SL1 and SL3, specifically also from outer edge to outer edge, is L2. The separation of the second and third slits SL2 and SL3 is greater than L1 (also measured at the opposing outer edges). According to the present invention, at least one vane (second vane or reference vane) is provided which has a length L2 which is greater than the length L1. The other vanes (first vanes) typically have a length L1. Similarly, windows with the lengths L1 or L2 can be provided.

The vanes of length L1 can only cover the slits SL1 and SL2 simultaneously. Only the vane of length L2 (reference vane) can simultaneously cover slits SL1 and SL3 and, in this arrangement, can thus also simultaneously cover the second slit SL2 (and the light sensors arranged thereunder) arranged between SL1 and SL3. In this manner, it is possible with one and the same arrangement, that is, the fork light barrier 1 shown, to implement in one housing determinations of both the reference position and of the incremental position. In particular, the spacing of the vanes, that is the width or length of the windows, can also be L1.

Figure 2:
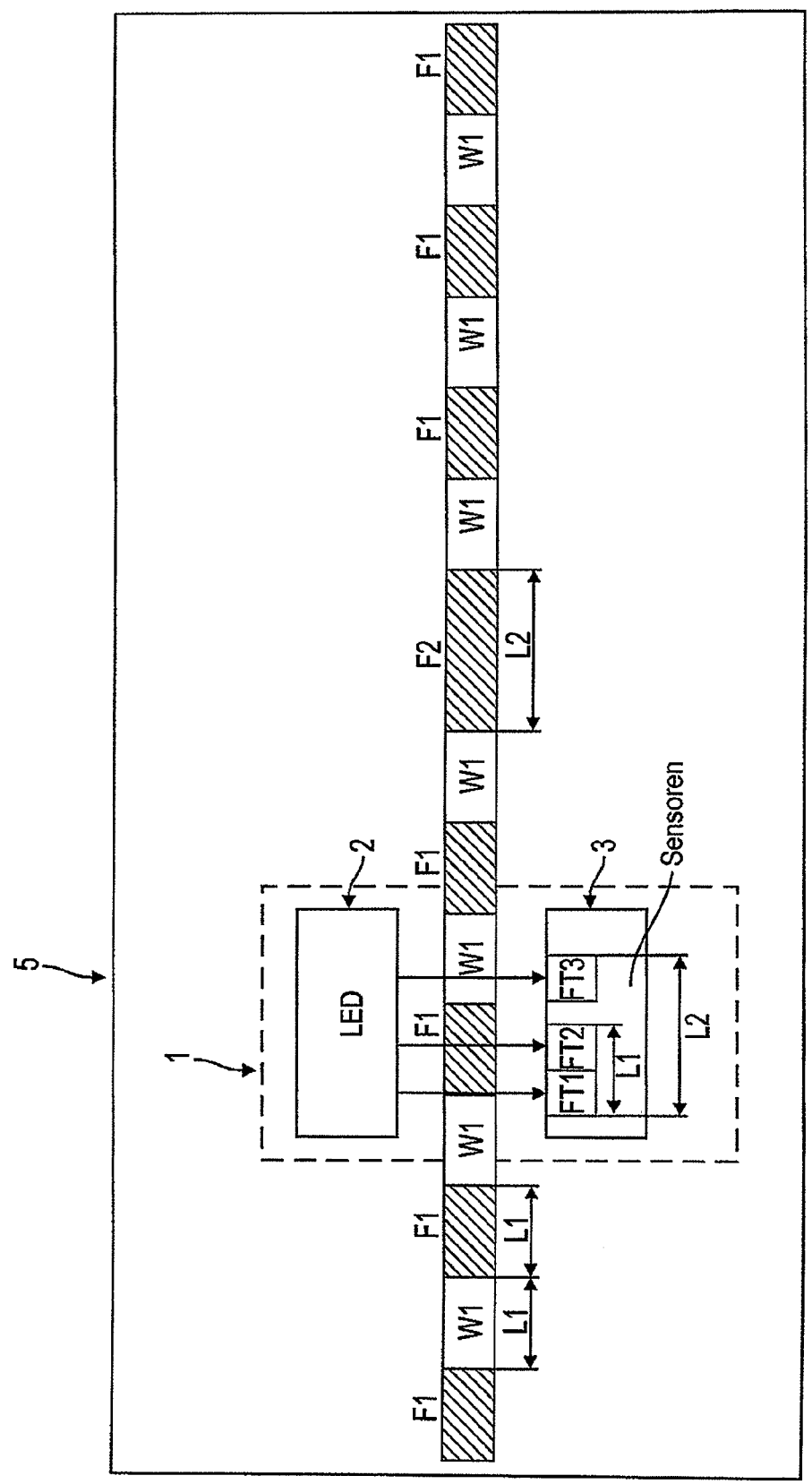
FIG. 2 is a schematic representation of the method and the device according to the present invention.

FIG. 2 shows a simplified schematic representation, by reference to which the functioning of the fork light barrier as well as of a device which uses the fork light barrier 1 of FIG. 1 is described in greater detail. The device 5 is indicated only schematically here and, accordingly, would therefore comprise both the fork light barrier 1 with the light sensors FT1, FT2 and FT3 and the light-emitting element LED, as well as a moving part (not shown) at which the vanes F1 and F2 are arranged. The vanes F1 correspond to the vanes of the first type, which have a length of L1. Each vane is separated from the next by a window W1 which, in the present exemplary embodiment, also has a length L1. Only the vanes of the second type (reference vane) F2 have a length L2. The length L2 corresponds to the external separation between the first light sensor FT1 and the third light sensor FT3. The position of the light sensors FT1, FT2 and FT3 can correspond, for example, to the slits SL1, SL2 and SL3 shown in FIG. 1. The first light sensor FT1 and the third light sensor FT3 are therefore arranged at an external separation L2 from one another. The first light sensor FT1 and the second light sensor FT2 have a separation L1 from one another in respect of the outer edges thereof. The separation between the second light sensor FT2 and the third light sensor FT3 is greater than L1 (also measured at the opposing outer edges of the sensors). Thus, in the relevant position, a vane F1 simultaneously covers both light sensors FT1 and FT2, but not all three light sensors FT1, FT2 and FT3. Only the reference vane F2 covers, with the length L2 thereof, all three light sensors FT1, FT2 and FT3 simultaneously in the relevant position. In an advantageous embodiment, the size of the vane F1 and the size of each window W1 is exactly L1. The size of the reference vane, that is, the vane of the second type, is 1.5*L1. Thus, L2 is equal to 1.5*L1 in this particular embodiment. Furthermore, the separation between the light sensor FT1 and the light sensor FT2 with respect to the mid-line of the two sensors is 0.5*L1. With respect to the mid-lines, the separation between the light sensor FT2 and the light sensor FT3 is thus 0.75*L1. The light sensors FT1 and FT2 thus serve, in general, for incremental position determination.

The vane of the second type (reference vane F2) does not have to have exactly the length of the separation of the two light sensors FT1 and FT3 (or slits SL1 and SL3). Although this is advantageous, embodiments are also possible in which the reference vane is longer than the separation between the two outermost light sensors FT1 and FT3.

In one exemplary embodiment of the present invention, the signals from both the light sensors FT1 and FT2 are evaluated as a two-place binary signal. This is shown by the following Table 1:

TABLE 1

| Vane F1 (or window W1) of the first type | | |
|---|---|---|
| FT1 | FT2 | FT3 |
| 0 | 0 | 1 |
| 1 | 0 | 1 |
| 1 | 0 | 0 |
| 1 | 1 | 0 |
| 0 | 1 | 0 |
| 0 | 1 | 1 |
| 0 | 0 | 1 |

Thus, if a vane F1 moves from left to right past the light sensors FT1 and FT2, a sequence will always be produced as in the above Table 1. Naturally, the logical levels could also be evaluated the other way around or can be subjected to an inversion, so that correspondingly inverted values are produced in the table. Similarly, the levels for a passing window of length L1 could be given and could either have the values given in Table 1 or the inverted values. Based on the sequence, it can always be determined in which direction one of the vanes F1 (or windows W1) moves past the light sensors FT1, FT2. The light sensor FT3 must not necessarily be included in this incremental positional determination. If a vane F2 of the second type (or a window with a suitable length) now passes the sensors, the two states of the following Table 2 can additionally result:

TABLE 2

| Special states for vane F2 (or window W2) of the second type | | |
|---|---|---|
| FT1 | FT2 | FT3 |
| 0 | 0 | 0 |
| 1 | 1 | 1 |

It should be noted that, for Table 2, the three ones and the three zeros can result for vanes or windows, depending on the type of fork light barrier, the type of light sensors and the number of resulting inversions. As a result, from the disclosed arrangement, it becomes possible to logically derive the reference position.

In further refined embodiments, a plurality of reference or zero locations are provided. Analogously, a plurality of reference vanes or reference windows can be provided.

Evaluation of the signals can be carried out using logical circuits or in a microcontroller, computer or the like. The corresponding electronics can be a component of the device itself or implemented externally.

The device is, for example, a balance and the moving part is part of the balance, for example, a cover or hood of the balance. The hood executes, for example, a circular movement for opening and closing. Arranged at the hood or cover are windows and vanes according to the present invention. Said vanes and windows move through the fork light barrier provided with the three light sensors and the light emitting element (e.g. light-emitting diode) according to the opening movement or the closing movement. Apart from the incremental position, the zero location of the hood or cover is then always reliably recognized based on the reference vane or the reference window using the fork light barrier according to the invention.

Figure 3:
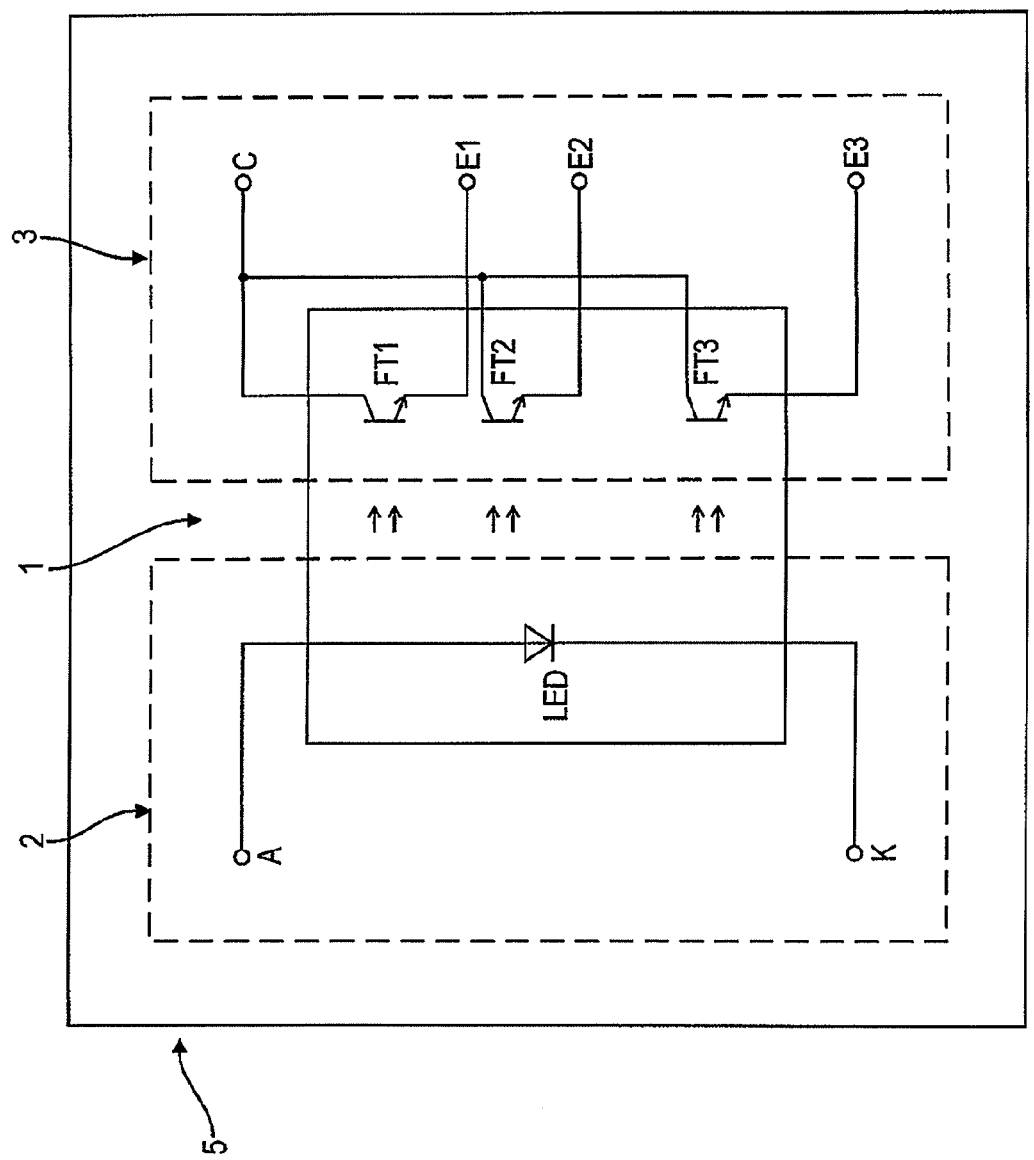
FIG. 3 is a simplified representation of an exemplary circuit arrangement according to the present invention.

FIG. 3 shows a simplified schematic representation of a fork light barrier 1 according to the present invention which, for example, is arranged in a device 5 which also has a moving part. The representation according to FIG. 3 shows the circuit implementation of the fork light barrier. The first limb 2 accordingly has a light-emitting diode LED which is connected with the anode and the cathode thereof to a voltage supply in order to emit light. Provided no interruption of the light path takes place, the light from the light-emitting diode LED falls on the second limb 3 in which the light sensors FT1, FT2, FT3 are arranged. Said light sensors are configured based on bipolar transistors of the NPN type. Due to the light incident on the bases of the light sensors FT1, FT2, FT3, a flow of current through the transistors is made possible. The collectors are connected together at the node C. The current flow through the respective transistor can then be determined or tapped off at the emitters. The individual light sensors FT1, FT2 and FT3 are advantageously arranged according to the geometrical data disclosed above with respect to FIG. 2 and FIG. 1. Therefore, based on the evaluation of the signals E1, E2 and E3, the position determination and the reference position determination are carried out in accordance with the above description.

In a variant embodiment, the fork light barrier is provided with three light-emitting components (for example, three LEDs) and only one light sensor. In this embodiment, the three light-emitting components must be switched on and off alternately at a pre-determined, sufficiently high frequency. Based on knowledge of the driving of the light-emitting elements and the state of the one light sensor (for example, photodiode) based thereon, the respective position of the windows or vanes can then also be determined. Accordingly, a reference position or a zero location can be determined by means of an elongated vane or an elongated window according to the previously described aspects.

The above description of the preferred embodiments has been given by way of example. From the disclosure given, those skilled in the art will not only understand the present invention and its attendant advantages, but will also find apparent various changes and modifications to the structures and methods disclosed. The applicant seeks, therefore, to cover all such changes and modifications as fall within the spirit and scope of the invention, as defined by the appended claims, and equivalents thereof.

The invention claimed is:

1. A position detecting device comprising:
   a moving part provided with vanes (F1, F2) alternating with windows (W1) on no more than a single track of alternating vanes and windows along a single axis extending in a moving direction of the moving part, and
   a fork light barrier for detecting movement of the moving part, wherein the fork light barrier is arranged along the movement direction of the moving part, and wherein the fork light barrier comprises:
   at least one light-emitting element on a limb of the fork light barrier, said element emitting light to an opposing limb during operation;
   at least one first, one second and one third light sensor (FT1 to FT3) on the opposing limb,
   wherein the second light sensor (FT2) is arranged between the first light sensor (FT1) and the third light sensor (FT3) in the movement direction, and
   wherein a separation (L1) in the movement direction between the first light sensor (FT1) and the second light sensor (FT2) is smaller than a separation in the movement direction between the second light sensor (FT2) and the third light sensor (FT3),
   wherein the fork light barrier and the moving part are arranged such that the movement of the moving part causes the windows and vanes to move between the limbs, a first light incidence state from the at least one light-emitting element onto either only the first sensor (FT1) or simultaneously onto the second and third light sensors (FT2, FT3) signals at least one of a movement direction and an incremental movement of the moving part, and a second light incidence state from the at least one light-emitting element onto the first, second and third light sensor (FT1, FT2, FT3) signals a reference position of the moving part,
   wherein the first incidence state is a light incidence interruption or a light incidence resumption, and the second incidence state is a simultaneous light incidence interruption or a simultaneous light incidence resumption.

2. The position detecting device as claimed in claim 1, wherein the three light sensors (FT1, FT2, FT3) and the at least one light-emitting element are arranged in a common housing.

3. The position detecting device as claimed in claim 1, wherein a given one of the windows (W1) lessens the incidence of light from the light-emitting element arranged at the fork light barrier (1) onto the light sensors (FT1 to FT3) less strongly than a given one of the vanes (F1, F2) and a length (L1) of a first vane (F1) or of a first window (W1) is shorter than a separation (L2) between the first light sensor (FT1) and the third light sensor (FT3) and a length (L2) of a second vane (F2) or of a second window (W2) is equally as large or larger than the separation (L2) between the first light sensor (FT1) and the third light sensor (FT3).

4. The device as claimed in claim 3, wherein the length (L2) of the second vane (F2) is one and a half times the length (L1) of the first vane (F1).

5. The device as claimed in claim 3, wherein a separation (L1) between the first light sensor (FT1) and the second light sensor (FT2) is half the length of the first vane (F1) and the separation between the second light sensor (FT2) and the third light sensor (FT3) is three quarters the length of the first vane (F1).

6. A method for detecting a position of a moving part with a fork light barrier, wherein the moving part is provided with vanes alternating with windows on no more than a single track of alternating vanes and windows along a single axis extending in a moving direction of the moving part, and wherein the fork light barrier is arranged with at least three light sensors extending along the movement direction of the moving part, comprising either a first process or a second process:
   wherein the first process comprises:
   simultaneously interrupting the incidence of a light beam onto only either one or two of the light sensors by the moving part in a first interrupting step,
   determining at least one of a movement direction and an incremental position of the moving part based on the first interrupting step,
   simultaneously interrupting the incidence of a light beam onto the three light sensors by the moving part in a second interrupting step, and
   determining a reference position of the moving part based on the second interrupting step,
   and wherein the second process comprises:
   simultaneously resuming the incidence of a light beam onto only either one or two of the light sensors by the moving part in a first resuming step,
   determining at least one of a movement direction and an incremental position of the moving part based on the first resuming step,
   simultaneously resuming the incidence of a light beam onto the three light sensors by the moving part in a second resuming step, and
   determining a reference position of the moving part based on the second resuming step.

7. The device as claimed in claim 1, wherein the fork light barrier comprises:
   no more than the first, the second and the third light sensors (FT1 to FT3) on the opposing limb of the fork light barrier.

8. The device as claimed in claim 1, wherein:
   the vanes alternating with the windows form a period that repeats without interruption along an entire length of the single track of the moving part that moves between the limbs of the fork light barrier.

* * * * *